United States Patent [19]

Maybon

[11] Patent Number: 4,699,848

[45] Date of Patent: Oct. 13, 1987

[54] COMPOSITION OF ABRASION-RESISTANT MATERIAL FOR APPLICATION TO A SURFACE

[76] Inventor: Guy Maybon, Route du Noiret, 74410 Saint Jorioz, France

[21] Appl. No.: 846,901

[22] Filed: Apr. 1, 1986

[30] Foreign Application Priority Data

Nov. 21, 1985 [FR] France ................. 85 17809

[51] Int. Cl.⁴ .................. B22F 7/04; B23K 35/40; B32B 15/02
[52] U.S. Cl. .................... 428/560; 428/564; 219/146.41; 219/146.51
[58] Field of Search ............... 428/553, 559, 560, 564; 148/31.5; 219/146.41, 146.31, 146.22; 427/120

[56] References Cited

U.S. PATENT DOCUMENTS

| | | |
|---|---|---|
| 2,107,434 | 2/1938 | Wilson . |
| 2,841,513 | 7/1958 | Morrison . |
| 3,359,096 | 12/1967 | Jost ........................................ 419/8 |
| 3,980,601 | 9/1976 | Marx et al. ................. 260/29.6 NR |
| 4,136,230 | 1/1979 | Patel ..................................... 428/564 |
| 4,205,218 | 5/1980 | Fukami et al. ................. 219/145.23 |
| 4,206,017 | 6/1980 | Robillard ................................ 204/2 |
| 4,306,059 | 12/1981 | Yokobayashi et al. ................. 536/1 |
| 4,315,883 | 2/1982 | Horikawa et al. .................. 264/174 |

FOREIGN PATENT DOCUMENTS

| | | | |
|---|---|---|---|
| 581645 | 9/1958 | Italy ..................................... 427/120 |
| 59-232838 | 12/1984 | Japan ..................................... 427/120 |
| 1007039 | 10/1965 | United Kingdom . |

Primary Examiner—John F. Terapane
Assistant Examiner—Eric Jorgensen
Attorney, Agent, or Firm—William H. Eilberg

[57] ABSTRACT

The invention provides a composition which is useful in applying an abrasion-resistant coating to a surface, typically by welding. The abrasion-resistant coating is preferably a mixture of tungsten carbide and an alloy. The composition is formed into a length of material extruded over a continuous metallic core, and then wound onto a spool. The composition includes both the tungsten carbide and an alloy having a melting temperature less than that of most ductile metals such as steel, alloy steel, nickel or nickel alloys. These components are mixed with an organic binder and a plasticizer. The organic binder enables the mixture to be extruded, and the plasticizer prevents the composition from becoming brittle after drying. When applied to the surface being coated, the alloy holds the particles of tungsten carbide together, and thus forms the desired coating. The alloy includes a plurality of round, or nearly round, particles. The round particles facilitate the extrusion process, and make the composition more supple. The invention also includes a method of forming the composition.

17 Claims, 2 Drawing Figures

COMPOSITION OF ABRASION-RESISTANT MATERIAL FOR APPLICATION TO A SURFACE

BACKGROUND OF THE INVENTION

This invention relates to the field of abrasion-resistant coatings. Specifically there is disclosed a composition of matter including an abrasion-resistant material, the composition being formed into a length of material and wound onto a spool. The abrasion-resistant material can then be deposited onto a surface with the application of heat.

The composition of the present invention is typically applied by welding. The welding apparatus may employ a flame, such as can be produced by an oxyacetylene torch, a TIG process, a so-called atomic hydrogen torch, or other processes using ionization of gases. U.S. Pat. No. 2,219,462 describes examples of compositions adapted to be applied to surfaces by welding. The patent shows such a composition, formed as a length of material. The material is generally formed in straight pieces, several tens of centimeters long. The pieces have a metallic core which is covered with a mixture, the mixture containing the items to be deposited onto the surface. The mixture is in the form of a powder, whose particles are bound together, and bound to the metallic core, by silicate binders.

Other compositions are formed of metallic tubes filled with a metal of a different composition, such as tungsten carbide. These structures have been made in the form of straight, rigid, and relatively short lengths of material. Metallic tubes filled with a different composition have also been formed in long lengths wound on a spool. The latter compositions are used with an automatic electric arc welding process.

The use of discrete lengths of coating materials, in a manual welding process, slows down the process of coating. When surfaces having large areas are being coated, one must use large quantities, i.e. many lengths, of the coating material. But each length of the composition can be used only for a limited time before it is consumed. As the composition is applied to the surface, the length of the piece of material decreases. To avoid the risk of a severe burn, the welder must either discard the butt or weld a new length of material to the butt. The latter procedure is a delicate operation which takes some time. Discarding the butt is also undesirable because it wastes material.

The present invention avoids the disadvantages of the compositions of the prior art, discussed above, and provides a means of increasing the productivity of persons manually applying coatings to surfaces. In particular, the invention provides the abrasion-resistant material in the form of a continuous length, which may be several tens of meters long, and which is sufficiently flexible to be packaged in spools. The composition can easily be wound and unwound, so that no material is wasted.

The present invention thus enjoys substantial advantages over the compositions known in the prior art. Metallic tubes filled with a different material, described above, are very difficult to wind and unwind manually, and they are not very flexible. Special precautions are necessary before handling them.

The composition of the present invention is very flexible, in comparison with the short, rigid lengths of material of the prior art. Despite its flexibility, the present composition can be handled and shipped without special precautions, and is unlikely to form cracks in the material under normal conditions of handling and use. Such cracks are undesirable, because they would cause irregularities in the coating being applied to the surface.

The invention also minimizes the undesirable effects of the metallic core of the composition. The metallic core generally melts at a much higher temperature than does the mixture surrounding the core. With the composition of the present invention, it is possible to reduce the diameter of the core, so that the core does not interfere with the process of applying the abrasion-resistant coating.

It has been difficult to reduce the diameter of the wire core, in compositions of the prior art. While the composition is being formed, it is necessary to guide the wire through an apparatus, and the wire must be guided without causing kinking or jamming problems. The present invention provides a composition which can be formed with a very thin core.

The composition of the present invention can be formed by an extrusion process, the abrasion-resistant material being part of a mixture which is formed around the metallic wire core. The composition can thus be formed in a long length of material, which can be easily wound on a spool and transported. In use, the composition is unwound from the spool, and applied to the surface, usually with a welding torch. It is not necessary to weld together short segments of the composition, or to discard unusable butts of the product.

SUMMARY OF THE INVENTION

The composition of the present invention comprises a mixture of the materials to be coated onto a surface, an organic binder, and a plasticizer, the mixture being formed along a continuous length of metallic wire. The materials to be coated preferably include particles of tungsten carbide, and particles of an alloy having a melting temperature less than that of the tungsten carbide. The alloy preferably contains chromium, silicon, and boron, the balance of the alloy being nickel. The particles of the alloy are preferably round. That is, the alloy particles should not have substantial numbers of sharp edges.

The organic binder is preferably a powder which, when it absorbs a solvent, assumes a form which can bind the particles of the alloy and the tungsten carbide, such that the entire mixture can be extruded. The solvent used should be one which tends not to evaporate too rapidly under normal temperature conditions, but instead remains in the binder, until it is driven out by heating, after the extrusion is completed.

The plasticizer can be any substance which makes the mixture homogeneous and smooth, and which will prevent the composition from becoming brittle after it is dried, after extrusion. The plasticizer thus makes the finished product sufficiently flexible to be wound in a spool having a diameter of the order of several tens of centimeters. Such a plasticizer can be a water soluble liquid such as glycerine, glycol, or triethanolamine. The plasticizer remains in the extruded product after drying, giving the product the needed flexibility.

According to the method of the present invention, the tungsten carbide particles, the nickel-based alloy particles, the organic binder and the plasticizer are mixed together with an appropriate solvent which enables the binder to hold the components together. The mixture is extruded over a continuous length of wire. The extruded product is dried in a furnace, where the solvent is expelled. The dried product is then wound in spools for later use.

The product is applied to coat a surface by use of a welding torch. The nickel-based alloy, having a melting temperature lower than that of the tungsten carbide, flows onto the surface to be coated, and carries with it the tungsten carbide particles. The carbide particles do not melt during the welding process. The abrasion-resistant coating thus comprises the tungsten carbide particles, embedded in the cooled nickel-based alloy. The alloy thus acts, in effect, as a solder for the tungsten carbide. The organic binder and plasticizer are burned off during the welding process.

It is therefore an object of the invention to provide a composition which includes an abrasion-resistant coating material, wherein the composition can be used to apply the coating to a surface by welding.

It is another object to improve the efficiency of the process of applying an abrasion-resistant coating to a surface.

It is another object to improve the safety and working conditions of personnel performing the above-described welding process.

It is another object to provide a composition containing an abrasion-resistant material, wherein the composition can be formed in one continuous flexible length, which can be wound onto a spool.

It is another object to provide a composition as described above, wherein the composition can be easily transported and stored, without special handling or precautions.

It is another object to provide a method of making a continuous length of material, displayed on a wire core, the material containing an abrasion-resistant material which can easily be transferred to a surface by application of heat.

Other objects and advantages of the invention will be apparent to those skilled in the art, from a reading of the following brief description of the drawings, the detailed description of the invention, and the appended claims.

DETAILED DESCRIPTION OF THE INVENTION

Figure 2:
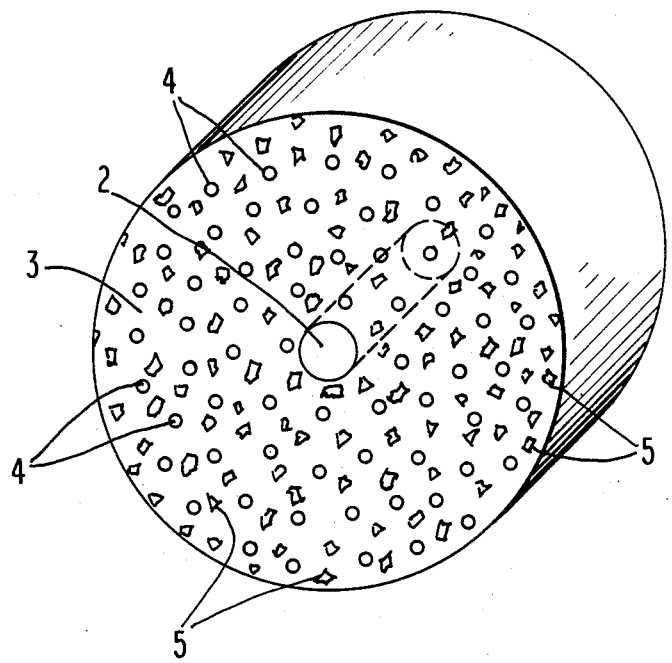
FIG. 2 is a schematic diagram of a cross-section of the composition of the present invention, illustrating the tungsten carbide and nickel-based alloy particles contained within the organic binder and formed over a wire.

The composition of the present invention is illustrated schematically in the cross-sectional view of FIG. 2. The composition is formed over a continuous metallic wire 2, which gives some rigidity to the entire composition. Tungsten carbide particles 5 and nickel-based alloy particles 4 are contained within material 3, which includes an organic binder and a plasticizer.

It is the tungsten carbide particles and the alloy particles that together form the abrasion-resistant material which will be deposited on the surface. When so deposited, the tungsten carbide and the alloy are not homogeneously mixed. Instead, the particles of tungsten carbide are concentrated at various locations throughout the bed of alloy particles, the alloy being a carrier and a solder for the tungsten carbide.

Figure 1:
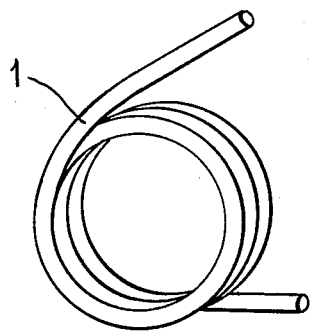
FIG. 1 shows a length of the composition of the present invention after having been wound on a spool.

As indicated in FIG. 1, the length 1 of the composition is flexible, and can be wound around an axis, on a spool (not shown), having a diameter of the order of several tens of centimeters.

The alloy particles 4 are illustrated in FIG. 2 as spheres. In practice, these particles are not perfect spheres. But it is desirable that at least 30%, by volume, of the particles of the composition have no sharp edges. The tungsten carbide particles 5 are shown with sharp edges. In general, most of the tungsten carbide particles will have sharp edges because it is difficult to form such particles with rounded edges.

The size of the tungsten carbide particles should be in the range of about 0.04-5.00 mm in diameter. The diameter of the alloy particles should be less than about 0.15 mm. In general, the tungsten carbide particles can be much larger than the alloy particles. It is the tungsten carbide that provides the hardness of the abrasion-resistant coating.

The diameter of the wire core 2 should be much smaller than that of the entire composition. Thus, if the outside diameter of the composition is in the range of about 5 to 10 mm, then the diameter of the core should be less than about 1.5 mm. It is important that most of the volume of the composition be occupied by the items which form the abrasion-resistant coating, and not by the components which melt at a higher temperature than the alloy powder mixed with the tungsten carbide. The core serves no purpose other than to provide a skeleton around which the other components can be formed. The core, which must be a ductile metal, always melts at a higher temperature than the nickel-based alloy.

The primary purpose of the organic binder is to hold the particles of the abrasion-resistant coating around the core, and to enable the mixture to be extruded over the core. The binder must therefore have sufficient binding strength to hold all the components together, and to prevent the particles of the alloy or the tungsten carbide from being blown away when the material is applied to the surface with a welding torch. The binder also helps to promote the flexibility that enables the composition to be wound in a spool, and should also have a sufficient tensile strength to prevent cracks in the composition.

Substances which can be used as the organic binder include hydroxyethylmethylcellulose, galactomanose, or carboxymethylcellulose, or combinations of these. Best results have been obtained with hydroxyethylmethylcellulose, which offers the best compromise between the various requirements of the binder, discussed above.

The use of hydroxyethylmethylcellulose is virtually unknown in the field of this invention. In the prior art, the discrete lengths of welding materials, including the lengths of material described in U.S. Pat. No. 2,219,462, contain silicates in a soda or potash binder. But a silicate binder has been found to be incompatible with hydroxyethylmethylcellulose. It is found that the silicates degrade the organic binder.

The alloy which is mixed with the tungsten carbide particles should preferably contain about 0.1–4.0% silicon, 0.7–4.0% boron, 0–16% chromium, with the balance of the alloy being nickel.

The following is an example of a composition formed according to the invention. A mixture is provided having about 60–68% tungsten carbide. The nickel-based alloy has about 1.5% silicon, 1.5% boron, and 7% chromium, the balance being nickel. This alloy represents about 32–40% of the total weight of the mixture. The organic binder is hydroxyethylmethylcellulose, in an amount of 0.5–1.5%. The plasticizer is glycerine, in an amount of 0.2–10%. Water is added in an amount that is in the range of 2–10% of the total, the amount being selected such that the binder can perform its function of facilitating extrusion of the mixture. The amounts of each component must be adjusted within the stated ranges so that the total is 100%.

In the example given above, the melting temperature of the alloy is about 1000° C. The tungsten carbide, by contrast, has a melting temperature of about 2750° C., while the wire core melts at about 1350° C. Thus, under normal welding conditions, the tungsten carbide is not melted, but instead is deposited onto the surface to be coated in solid form, its particles being carried by the alloy. It is preferred that the melting temperature of the alloy be less than about 1100° C.

The organic binder, which is initially in the form of a powder, is mixed with the tungsten carbide particles and the alloy particles, and the solvent and plasticizer. The mixture is then extruded around a continuous wire core. The product is then dried in a furnace, to eliminate the residual solvent. The solvent can be water, alcohol, or any other suitable substance.

The composition is formed by a machine which is commercially available from Oerlikon, a Swiss company, the machine used herein being known by its model number of EP12. This machine includes an extrusion press, means for pulling the wire core through the press and through the extrusion die, and means for pushing the mixture through the die.

At the input side of the machine, there is provided a device for unwinding the wire core, which itself is stored in a spool before use. At the output side of the machine, another device is provided for taking up the extruded product, and to wind it on another spool. It is preferred that the second spool be the one which pulls the wire through the machine, so that the proper tensile forces can be applied to the wire. By pulling the wire from the output side of the machine, it is feasible to guide the wire properly, even when its diameter is small, typically less than about 1.5 mm.

The wire is preferably a relatively elastic metal. A partly drawn nickel wire has been used successfully. It is important that the final product retain some degree of elasticity, so that when mechanical forces are applied, these forces are distributed along the length of the composition, preventing bends or cracks from forming. In other words, the product of the invention, when unwound from its spool, should preserve its "arc" to some degree, and should not be so soft that it sags. Bends or cracks can cause imperfections in the coating, and therefore must be avoided.

The roundness of the particles in the alloy, or at least the absence of a large number of sharp edges, is an important feature of the composition. It is believed that the roundness of the particles contributes to the flexibility of the composition, and facilitates its extrusion. As the proportion of round particles in the alloy increases, the amounts of plasticizer and organic binder can therefore be decreased. Conversely, if the proportion of rounded particles is too low, it is necessary to increase the proportion of organic binders and plasticizer. Indeed, it is believed that if all of the particles in the alloy were round, the plasticizer could be eliminated entirely.

The organic binder must be present in such an amount that it facilitates extrusion, and improves the mechanical properties of the product, but its proportion must also be small enough to avoid the problem of allowing particles to be blown away by the welding flame. It is important that the components of the composition not be blown away; the components should remain together, so that they can fuse together in a molten or semi-molten drop, ensuring that the correct mixture of material will be deposited on the surface to be coated. A proportion of organic binder in the range of 0.5–1.5%, as mentioned above, has been found to yield the best results.

It is preferable to use an organic binder which is able to absorb at least five times its weight of liquid. In this way, the extrusion is facilitated, and after the composition is dried, the shrinkage of the binder tends to bring the particles in the composition together, thereby improving the properties of the product.

It is also desirable that the organic binders, when burned during the welding process, produce only harmless byproducts, such as water and carbon dioxide. The binders discussed above have this advantage. The composition of the present invention thus has the added advantage of improving the working conditions of the welding personnel.

While the invention has been described with respect to certain chemical components, it is understood that many variations are possible. Different organic binders and plasticizers can be substituted. The components of the nickel-based alloy can be varied. Different solvents can be used to mix with the organic binder. The thickness and composition of the core wire can be varied. The invention is not limited to tungsten carbide; any other hard material, having a relatively high melting point, could be used. These and other modifications are to be deemed within the spirit and scope of the following claims.

What is claimed is:

1. A product used for applying a coating of an abrasion-resistant material to a surface, by application of heat, the product including a continuous metallic core and a composition formed over said core, the composition comprising:
    (a) a plurality of tungsten carbide particles,
    (b) a plurality of particles of a nickel-based alloy, the alloy comprising, by weight, about 0.1–4% silicon, about 0.7–4% boron, about 0–16% chromium, the balance being nickel,
    (c) an organic binder, in an amount, by weight, of about 0.5–1.5%, and
    (d) a plasticizer,
    the composition being formed in a substantially continuous length over the core, the product having sufficient flexibility to be wound on a spool.

2. The composition of claim 1, wherein at least 30%, by volume, of the particles of the composition are substantially free of sharp edges.

3. The composition of claim 2, wherein the organic binder is a substance selected from the group consisting of hydroxyethylmethylcellulose, galactomanose, and carboxymethylcellulose.

4. The composition of claim 3, wherein the plasticizer is a substance selected from the group consisting of glycerine, glycol, and triethanolamine.

5. The composition of claim 4, wherein the alloy contains about 1.5% silicon, 1.5% boron, and 7% chromium.

6. A product used for applying a coating of an abrasion-resistant material to a surface, by application of heat, the product including a continuous metallic core and a composition formed over said core, the composition comprising particles of the abrasion-resistant material, an organic binder, and a plasticizer, the abrasion-resistant material, binder and plasticizer being present as a generally homogeneous mixture, wherein the product can be formed into a generally cylindrical length, and wherein at least 30%, by volume, of the particles of the composition are substantially free of sharp edges.

7. The composition of claim 6, wherein the abrasion-resistant material includes tungsten carbide.

8. The composition of claim 7, wherein the abrasion-resistant material further includes a nickel-based alloy.

9. The composition of claim 8, wherein the alloy includes silicon, boron, and chromium.

10. The composition of claim 9, wherein the organic binder is a material selected from the group consisting of hydroxyethylmethylcellulose, galactomanose, and carboxymethylcellulose.

11. The composition of claim 6, wherein the abrasion-resistant material comprises first and second substances, the second substance having a melting point lower than that of the first substance, wherein the second substance comprises a solder for bonding the first substance to the surface to be coated.

12. The composition of claim 11, wherein the first substance is tungsten carbide, and wherein the second substance is a nickel-based alloy.

13. The composition of claim 6, wherein the diameter of the particles is in the range of about 0.04–5.00 mm.

14. A product used for applying a coating of an abrasion-resistant material to a surface, by application of heat, the product including a continuous metallic core and a composition formed over said core, the composition comprising:
   (a) a plurality of tungsten carbide particles,
   (b) a plurality of particles of a nickel-based alloy, the alloy comprising, by weight, about 0.1–4% silicon, about 0.7–4% boron, about 0–16% chromium, the balance being nickel,
   (c) an organic binder, in an amount, by weight, of about 0.5–1.5%, and
   (d) a plasticizer,
   the composition being formed in a substantially continuous length over the core, the product having sufficient flexibility to be wound on a spool, and wherein the diameter of the tungsten carbide particles is in the range of about 0.04–5.00 mm.

15. The composition of claim 14, wherein at least 30%, by volume, of the particles of the composition are substantially free of sharp edges.

16. A product used for applying a coating of an abrasion-resistant material to a surface, by application of heat, the product including a continuous metallic core and a composition formed over said core, the composition comprising the abrasion-resistant material, an organic binder, and a plasticizer, wherein the product can be formed into a generally cylindrical length, and wherein the abrasion-resistant material comprises a plurality of tungsten carbide particles having a diameter in the range of about 0.04–5.00 mm.

17. The composition of claim 16, wherein at least 30%, by volume, of the particles of the composition are substantially free of sharp edges.

* * * * *

REEXAMINATION CERTIFICATE (3636th)

United States Patent [19]
Maybon

[11] B1 4,699,848
[45] Certificate Issued Sep. 29, 1998

[54] COMPOSITION OF ABRASION-RESISTANT MATERIAL FOR APPLICATION TO A SURFACE

[75] Inventor: Guy Maybon, Saint Jorioz, France

[73] Assignee: Technogenia S.A., Societe Anonyme, Saint Jorioz, France

Reexamination Request:
No. 90/004,729, Aug. 22, 1997

Reexamination Certificate for:
Patent No.: 4,699,848
Issued: Oct. 13, 1987
Appl. No.: 846,901
Filed: Apr. 1, 1986

[30] Foreign Application Priority Data

Nov. 21, 1985 [FR] France .................. 85 17809

[51] Int. Cl.⁶ .............. B22F 7/04; B23K 35/40; B32B 15/02
[52] U.S. Cl. .............. 428/560; 428/564; 219/146.41; 219/146.51
[58] Field of Search .............. 428/560, 564, 428/553, 559; 219/146.41, 146.51; 148/315; 146/146.31, 146.22; 427/120

[56] References Cited

U.S. PATENT DOCUMENTS

| | | | |
|---|---|---|---|
| 2,219,462 | 10/1940 | Wissler | 219/8 |
| 3,503,844 | 3/1970 | Clement | 161/175 |

FOREIGN PATENT DOCUMENTS

| | | |
|---|---|---|
| 2.081.169 | 12/1971 | France . |
| 2.125.649 | 9/1972 | France . |
| 2 255 991 | 7/1975 | France . |
| 1327621 | 8/1973 | United Kingdom . |

OTHER PUBLICATIONS

ASM Handbook, vol. 7, Powder Metallurgy, 1984, pp. 816–822, 825–827.
Article "Water–Soluble Resins", Davidson and Sittig, 1962, pp. 91 and 95.
Publication "Metco", Sep. 1958, Metallizing Engineering Co., Inc., p. 1 and table of contents.
Publications from "Castolin", 1973, Considered English Pages.

*Primary Examiner*—Daniel J. Jenkins

[57] ABSTRACT

The invention provides a composition which is useful in applying an abrasion-resistant coating to a surface, typically by welding. The abrasion-resistant coating is preferably a mixture of tungsten carbide and an alloy. The composition is formed into a length of material extruded over a continuous metallic core, and then wound onto a spool. The composition includes both the tungsten carbide and an alloy having a melting temperature less than that of most ductile metals such as steel, alloy steel, nickel or nickel alloys. These components are mixed with an organic binder and a plasticizer. The organic binder enables the mixture to be extruded, and the plasticizer prevents the composition from becoming brittle after drying. When applied to the surface being coated, the alloy holds the particles of tungsten carbide together, and thus forms the desired coating. The alloy includes a plurality of round, or nearly round, particles. The round particles facilitate the extrusion process, and make the composition more supple. The invention also includes a method of forming the composition.

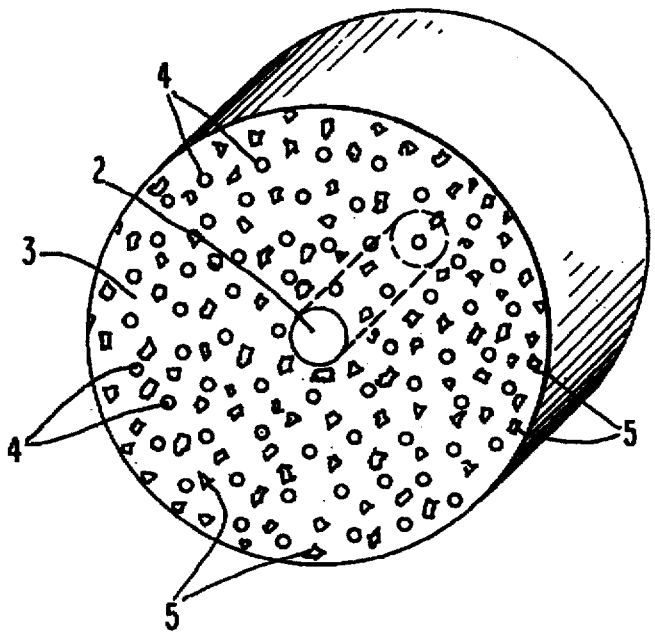

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–17 is confirmed.

* * * * *